US012395548B2

(12) United States Patent
Ergen et al.

(10) Patent No.: US 12,395,548 B2
(45) Date of Patent: Aug. 19, 2025

(54) SYSTEMS AND METHODS FOR UTILIZING DISTRIBUTED COMPUTING AND STORAGE RESOURCES

(71) Applicant: DISH Network L.L.C., Englewood, CO (US)

(72) Inventors: Chris Ergen, Littleton, CO (US); Jeffrey McSchooler, Parker, CO (US); Mark H. Gomez, Parker, CO (US); Jennings Maxwell Orcutt, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 49 days.

(21) Appl. No.: 16/934,786

(22) Filed: Jul. 21, 2020

(65) Prior Publication Data

US 2022/0030050 A1 Jan. 27, 2022

(51) Int. Cl.
*H04L 67/10* (2022.01)
*G06N 5/04* (2023.01)
(Continued)

(52) U.S. Cl.
CPC .............. *H04L 67/10* (2013.01); *G06N 5/04* (2013.01); *G06N 20/00* (2019.01); *H04L 67/1008* (2013.01); *H04W 84/042* (2013.01)

(58) Field of Classification Search
CPC ... H04L 67/10; H04L 67/1008; H04W 84/042
See application file for complete search history.

(56) References Cited

U.S. PATENT DOCUMENTS 6,757,730 B1 * 6/2004 Lee .................. G06F 9/465
709/201
7,254,607 B2 * 8/2007 Hubbard ............. G06F 11/3672
709/224
(Continued)

FOREIGN PATENT DOCUMENTS

CA          2962999 A1 *  9/2018  .............. G06F 11/30
WO    WO-2005073854 A2 *  8/2005  .......... G06F 9/5072
WO       2017/130244 A2     8/2017

OTHER PUBLICATIONS

International Search Report and Written Opinion, mailed Oct. 29, 2021, for International Application No. PCT/US2021/042421, 15 pages.
(Continued)

*Primary Examiner* — James R Sheleheda
(74) *Attorney, Agent, or Firm* — Kipman T. Werking; Frontier IP Law PLLC

(57) ABSTRACT

Systems and methods for utilizing distributed computing and storage resources intelligently select processing and/or storage resources of cell sites, data centers and/or other computing nodes and tap into these available processing and data storage resources to harness these resources on behalf of other remote devices to increase the amount of computing and storage data resources to perform tasks and store data for various services. The system predicts demand and usage and dynamically selects and adjusts utilization of computing resources to meet the demand and utilize otherwise idle systems. To improve latency and reduce network congestion by avoiding adding network traffic over longer and more complex routes, the system provides resources to particular remote devices based on the geographic proximity of the computing node to the particular remote device requesting the resources.

20 Claims, 7 Drawing Sheets

(51) Int. Cl.
*G06N 20/00* (2019.01)
*H04L 67/1008* (2022.01)
*H04W 84/04* (2009.01)

(56) References Cited

U.S. PATENT DOCUMENTS

| | | | |
|---|---|---|---|
| 8,190,593 B1 | 5/2012 | Dean | |
| 9,201,690 B2* | 12/2015 | Meng | G06F 9/4881 |
| 10,168,953 B1* | 1/2019 | Gupta | G06F 3/067 |
| 10,725,825 B2* | 7/2020 | Sindhu | G06F 9/46 |
| 10,761,889 B1* | 9/2020 | Jain | G06F 9/5005 |
| 11,012,501 B1* | 5/2021 | Tkach | H04L 67/1097 |
| 11,330,470 B2* | 5/2022 | He | H04W 28/0983 |
| 2006/0075408 A1* | 4/2006 | Powers | G06F 9/5072 |
| | | | 718/100 |
| 2008/0235317 A1* | 9/2008 | Burgmans | G06F 9/5072 |
| | | | 709/201 |
| 2010/0223385 A1 | 9/2010 | Gulley et al. | |
| 2012/0096165 A1 | 4/2012 | Madduri et al. | |
| 2014/0038654 A1* | 2/2014 | Ahmadi | H04W 76/14 |
| | | | 455/517 |
| 2014/0293784 A1* | 10/2014 | Haberland | H04W 88/04 |
| | | | 370/235 |
| 2015/0039764 A1 | 2/2015 | Beloglazov et al. | |
| 2016/0301624 A1 | 10/2016 | Gonzalez et al. | |
| 2018/0054328 A1* | 2/2018 | Chakravarty | H04W 4/70 |
| 2019/0197780 A1* | 6/2019 | Rao | H04W 8/24 |
| 2019/0245757 A1 | 8/2019 | Meyer et al. | |
| 2019/0245806 A1* | 8/2019 | Hanes | H04L 67/12 |
| 2020/0007460 A1* | 1/2020 | Guim Bernat | G06F 9/5072 |
| 2020/0314017 A1* | 10/2020 | Streijl | H04L 47/2425 |
| 2021/0144198 A1* | 5/2021 | Yu | H04W 28/0967 |
| 2021/0144517 A1* | 5/2021 | Guim Bernat | G06F 9/5072 |
| 2021/0204170 A1* | 7/2021 | He | H04W 28/0975 |
| 2021/0208949 A1* | 7/2021 | Bijwe | G06F 9/5044 |

OTHER PUBLICATIONS

Kuhn, "Pause Engine for Resource Throttling," URL=https://priorart.ip.com/IPCOM/000208536, IP.com, published Jul. 12, 2011, 3 pages.

* cited by examiner

SYSTEMS AND METHODS FOR UTILIZING DISTRIBUTED COMPUTING AND STORAGE RESOURCES

TECHNICAL FIELD

The present disclosure relates to utilization of computing and storage resources, and particularly to utilizing distributed computing and storage resources.

BRIEF SUMMARY

With massive growth in digital data volume and proliferated use of smartphones, laptops, and tablets, growth of the Internet of Things (IoT) market, and increasing penetration of high-end cloud computing, demand for computing and data storage continues to grow at an increasing rate. This includes demand for services built around the on-demand software-as-a-service (SaaS), platform-as-a-service (PaaS) and infrastructure-as-a-service (IaaS) delivery models, as well as demand for resources that are not on-demand, such as large computing tasks that do not have real-time or mission critical requirements. Along with increasing amounts of connected devices, including those in computers, wireless devices, cellular telephones, data centers, sensors, cellular (cell) sites, telecommunication base stations and other network or communication hubs, etc., (referred to herein collectively as "computing nodes"), there is an increase in idle or otherwise available computing and storage resources. This is due to these computing nodes having processing or storage resources that need not be continuous use or at full capacity in order to perform the primary tasks of the particular computing node. The present disclosure improves the technology of computing and data storage by intelligently selecting such computing nodes and tapping into these available processing and data storage resources to harness these resources on behalf of other remote devices to increase the amount of computing and storage data resources to perform tasks and store data for various services.

In one embodiment, the system determines availability for allocation of resources of one or more geographically separated computing nodes to facilitate meeting demand from a remote device for additional resources (e.g., additional processing and/or data storage resources). The availability is determined based on the computing node also being able to meet demand to perform primary tasks of the computing node. For example, the system may determine the resource of the computing node is available for allocation to perform other tasks if the central processing unit (CPU) of the computing node is idle and predicted to continue to be idle for a particular time period. The system then causes such geographically separated computing nodes to automatically use available resources of the computing nodes to facilitate meeting the demand for additional resources based on the determination. The system may also cause one or more of the computing nodes to cease or reduce the use of resources currently being used for meeting the demand for additional resources in order to meet the demand to perform the primary tasks of the computing nodes.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Figure 1:
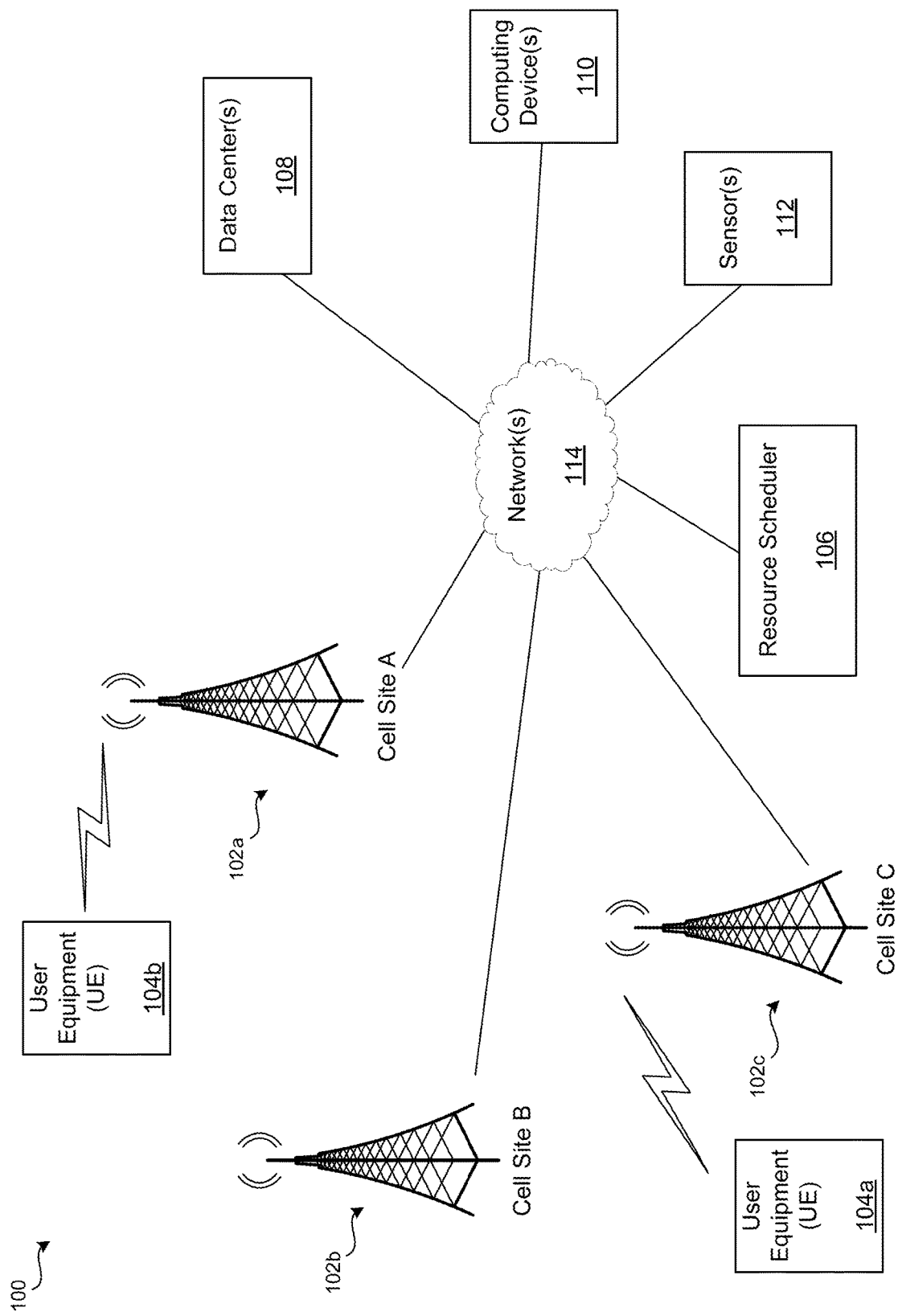
FIG. 1 is a block diagram of an example system for utilizing distributing computing and storage resources, according to various embodiments of the present disclosure.

FIG. 1 is a block diagram of an example system 100 for utilizing distributed computing and storage resources, according to various embodiments of the present disclosure. The system 100 includes a plurality of cell sites, including cell site A 102a, cell site B 102b and cell site C 102c, which may be geographically separated. In various embodiments, there may be additional or fewer cell sites. A cell site, which also may be referred to as a cell tower, cell base station or transceiver, may comprise or include a cellular-enabled mobile device site where antennas and electronic communications equipment are placed (e.g., on a radio mast, tower, or other raised structure) to create a cell in a cellular network. The cell site may include an apparatus for transmitting and receiving electromagnetic waves in the radiofrequency (RF) range and it is the site through which cellular devices communicate with communication systems deployed throughout the world. The antennas of a cell site are the source of radiofrequency radiation that is transmitted through the spatial volume of the cell that it serves. Although the present example includes cell sites, various other embodiments may include other types of base stations that provide various different types of wireless communication. A particular cell site or base station (e.g., cell site A 102a) constitutes a link in a network of additional cell sites or base stations (e.g., cell site B 102b and cell site C 102c), as part of a communication system covering a wide geographic area, providing cellular and other communication services.

A radio access network (RAN) may include various types of facilities including cell sites, such as cell site A 102*a*, cell site B 102*b* and cell site C 102*c*. These facilities connect mobile users and wireless devices, such as user equipment (UE) 104*a* and UE 104*b*, to the main core network, which may comprise part of network(s) 114. In the present example, three UEs are shown for illustrative purposes, but many additional UEs are present in various embodiments. Also, UEs, including UE 104*a* and UE 104*b*, may include, or be part of, various types of devices including, but not limited to: smartphones, tablets, notebook computers, mobile devices, sensors, vehicles, autonomous vehicles, machinery, appliances, smart speakers, digital assistants, security cameras, monitoring devices, home electronics, media players, receiving devices, set-top boxes, other computing devices and IoT devices, etc.

Network(s) 114 may also provide connectivity to other networks and geographically separated devices, such as computing device(s) 110, sensor(s) 112, and devices in data center(s) 108 (e.g., local data centers, regional data centers, national data centers) and resource scheduler 106. In the present example embodiment, network(s) 114 include the main mobile core network which provides subscriber profile information, subscriber location, authentication of services, and the necessary switching functions for voice and data sessions, including circuit-switched services, packet-switched services. Network(s) 114 may also provide cloud-aligned, service-based architecture (SBA) that spans across various functions and interactions including authentication, security, session management and aggregation of traffic from end devices. Network(s) 114 may also include equipment and provide functionality to provide Internet connectivity to UEs, including UE 104*a* and UE 104*b* and connectivity to other devices and systems, such as computing device(s) 110, sensor(s) 112, and devices in data center(s) 108 and resource scheduler 106, via other additional or integrated networks. For example, network(s) 114 may comprise one or more computer networks, one or more wired or wireless networks, satellite transmission media, one or more cellular networks, the Internet or some combination thereof, including routers, switches, gateways and other network equipment providing such connectivity. The network(s) 114 may include a publicly accessible network of linked networks, possibly operated by various distinct parties, such as the Internet. Network(s) 114 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the network(s) 114 may include various types of wired and/or wireless networks in various situations, including satellite transmission.

In addition, users or devices within the system 100 may utilize additional client computing systems and/or other client devices (not shown) which interact with the resource scheduler 106 to obtain and utilize various described computing and data storage resources via the network(s) 114. In certain implementations, the various users and devices of the system 100 may interact with the resource scheduler 106 and/or one or more other devices using an optional private or dedicated connection to obtain and utilize various described computing and data storage resources.

In some embodiments, computing device(s) 110, sensor(s) 112, and devices in data center(s) 108 and resource scheduler 106 may also or instead be wireless devices, such as UE 104*a* and UE 104*b*, or devices located with or as part of cell sites, such as cell site B 102*b* and cell site C 102*c*.

The 5th generation of mobile networks (5G), a significant evolution of fourth generation (4G) Long Term Evolution (LTE) mobile networks, enables instantaneous connectivity to billions of devices (the IoT). In some example embodiments, one or more of cell sites A 102*a*, B 102*b* and C 102*c* may comprise a Next Generation NodeB (gNodeB or gNB) cell site or base station of a 5G mobile network. For example, one or more of cell sites A 102*a*, B 102*b* and C 102*c* may comprise small cells, which are a major feature of 5G mobile networks particularly at the millimeter wave (mmWave) frequencies where the connection range is very short. Small cells are mini cell sites or base stations designed for localized coverage typically from 10 meters to a few hundred meters providing in-fill for a larger macro network. To provide a continuous connection, small cells are distributed in clusters depending on where users require connection, which complement the macro network that provides wide-area coverage. 5G macro cells are cell sites that use multiple input, multiple output (MIMO) antennas that have multiple elements or connections to send and receive more data simultaneously. The benefit to users is that more people can simultaneously connect to the network and maintain high throughput. Where MIMO antennas use very large numbers of antenna elements, they are often referred to as "massive MIMO", however, the physical size is similar to existing third generation (3G) and fourth generation (4G) cell site antennas. In some example embodiments, one or more of cell sites A 102*a*, B 102*b* and C 102*c* may comprise such 5G macro cells.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them. Characteristics of the MEC include the low latency, high bandwidth and real time access to RAN information that distinguish 5G architecture from its predecessors. In one embodiment, this low latency, high bandwidth and real time access to an increasing number of small and macro cells, such as cell sites A 102*a*, B 102*b* and C 102*c*, and data centers, such as data center(s) 108, is utilized in a unique way to tap into the available computing and data storage resources at these computing nodes to harness these resources on behalf of other remote devices and users. In one embodiment, the scheduling and allocation of such resources may be performed and/or facilitated by resource scheduler 106.

Figure 2:
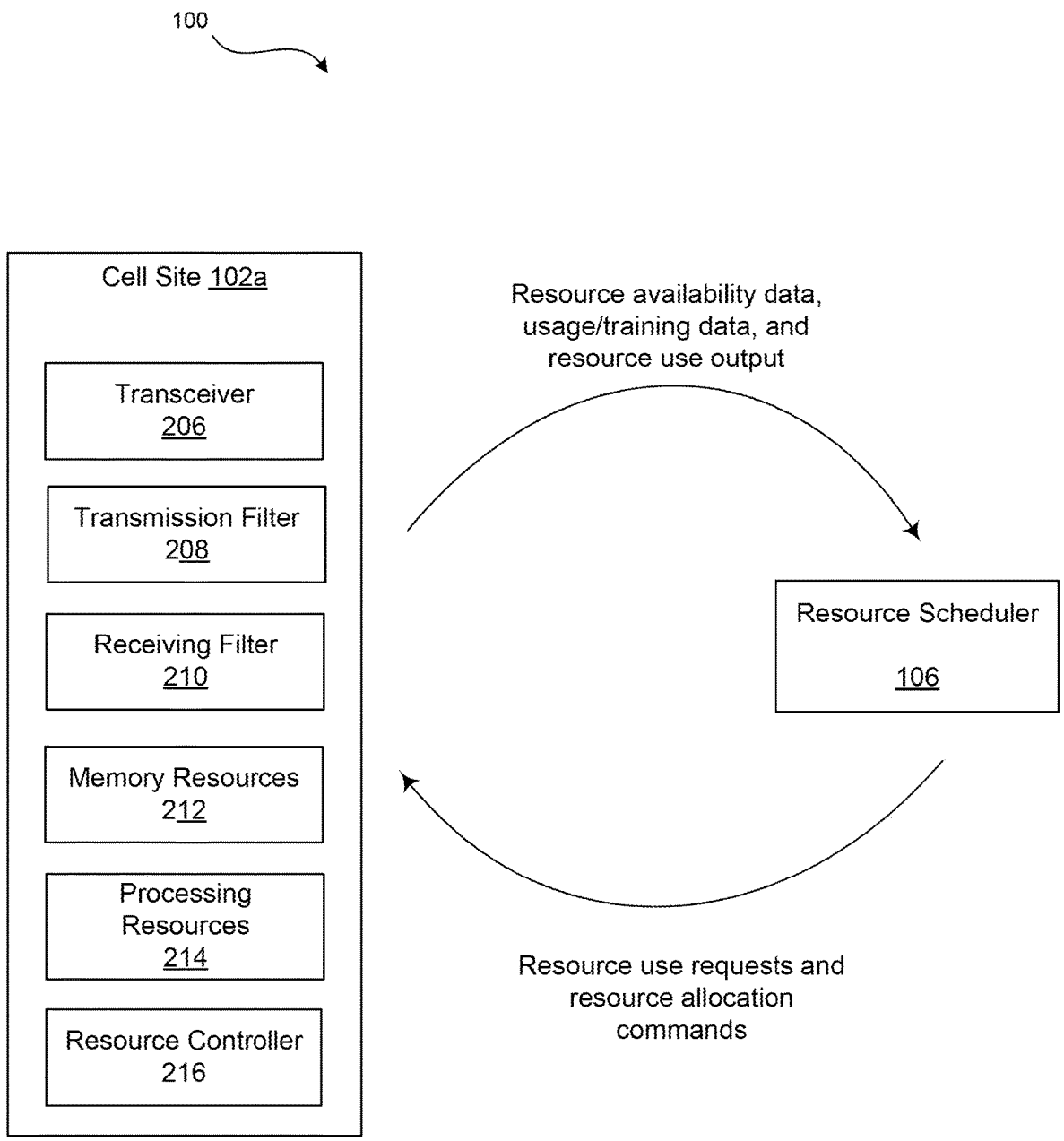
FIG. 2 is a block diagram of an example cell site and communication with an example resource scheduler, according to various embodiments of the present disclosure.

FIG. 2 is a block diagram of an example cell site 102*a* and communication with an example resource scheduler 106, according to various embodiments of the present disclosure. One or more components of the cell site 102*a* may also or instead be included as part of the resource scheduler 106 as applicable to provide the functionality as described herein. The cell site 102*a* is provided as an example of one computing node, a network of computing nodes that may at various times have computing and/or storage resources available for use by other remote devices and systems, such as those of authorized third-parties remote from the cell site 102*a*. Such remote devices may include computing devices 110 of FIG. 1, for example. However, in various embodiments, the network of computing nodes may include different or additional types of devices or systems that at various times have computing and/or storage resources available for use by devices and systems of authorized third-parties. For example, data center(s) 108 and/or sensor(s) 112 of FIG. 1 may be examples of or include computing nodes that may at various times have computing and/or storage resources available for use by other remote devices and systems. Other examples of such computing nodes include, but are not limited to: smartphones, tablets, notebook computers, mobile devices, sensors, vehicles, autonomous vehicles, machinery, appliances, smart speakers, digital assistants, security cameras, monitoring devices, home electronics, media players, receiving devices, set-top boxes, other computing devices and IoT devices, etc. The above also serves as examples of computing device(s) 110 of FIG. 1. Use of such available computing and storage resources of the network of computing nodes, including cell site 102*a*, may be controlled, managed and/or scheduled by resource scheduler 106.

In some example embodiments, the cell site 102*a* may comprise a gNB cell site or base station of a 5G mobile network. However, the cell site 102*a* may comprise other types of cell sites or base stations in various other embodiments. In the present example embodiment, the cell site 102*a* includes a transceiver 206, a transmission filter 208, a receiving filter 210, memory resources 212, processing resources 214 and a resource controller 216. Depending on the desired configuration, processing resources 214 may include one more processors of any type including but not limited to a microprocessor (pP), a microcontroller (pC), a digital signal processor (DSP), a central processing unit (CPU), a graphics processing unit (GPU), a Field Programmable Gate Arrays (FPGA), an Application Specific Integrated Circuits (ASIC), or any combination thereof. Processing resources 214 may include one more levels of caching, a processor core and registers. An example processor core may include an arithmetic logic unit (ALU), a floating point unit (FPU), a digital signal processing core (DSP Core), or any combination thereof. An example memory controller may also be used with processing resources 214, or in some implementations memory controller may be an internal part of processing resources 214.

Depending on the desired configuration, memory resources 212 may include one or more memory devices of any type including, but not limited to, volatile memory (such as random access memory (RAM), non-volatile memory (such as read-only memory (ROM), flash memory, hard drives, solid state drives, etc.), or any combination thereof. Memory resources 212 may include storage of an operating system, one or more applications, and program data, including computer-executable instructions implementing operations of the cell site 102*a*, including the resource controller 216. In some implementations, the memory resources 212 may store computer-executable instructions that are run by the processing resources 214 to perform the functions as described herein including those described with respect to at least FIGS. 3-6. Program data stored in memory resources 212 may include task related information, such as, without limitation, task data related to executing instructions for performing methods for scheduling wireless data transmission described herein.

The transceiver 206 transmits mobile communication signals to UEs 104*a* and 104*b*, to other cell sites or base stations, and to other communication systems to enable mobile communication and access to the Internet.

The memory resources 212 include one or more computer readable media that store software instructions for establishing a mobile communication network including the cell site 102*a*. The processing resources 214 execute the instructions stored in one or more computer readable media of the memory resources 212. The processing resources 214 may execute the instructions that comprise all or part of the resource controller 216. The resource controller 216 may communicate with the resource scheduler 106 via network(s) 114 of FIG. 1 to allocate processing resources 214 (e.g., processing unit time) and/or memory resources 212 for use by the cell site 102*a* and remote computing devices, such as those of authorized third parties, including computing device(s) 110 of FIG. 1. The resource controller 216 may monitor usage of processing resources 214 and/or memory resources 212 by the cell site 102*a* and remote devices and also the specific applications and tasks that are using such resources and communicate such resource availability data in real-time or near real time to the resource scheduler 106. For example, the usage data may include data indicative of usage history of one or more processing units of the cell site 102*a* and/or storage devices cell site 102*a*. Such usage data, usage statistics and other metadata associated with the usage (e.g., time of day, day of week, time of month, month of year, time of year, and geographic location of the cell site) may also be communicated to the resource scheduler 106. The resource controller 216 may also provide the output or result of the usage of the processing resources 214 and/or memory resources 212 to the resource scheduler to provide to the remote computing device that requested the additional available resources and/or communicate such resource use output directly to the remote computing device that requested the additional available resource.

The resource scheduler 106 uses the data received from the resource controller 216 to determine availability for allocation of resources of cell site 102*a* to facilitate meeting demand from a remote device, such as computing device 110, for additional resources while also meeting demand to perform primary tasks of the cell site 102*a*. For example, the resource scheduler 106 may determine a processing resource 214 of cell site 102*a* is available for usage by a remote device based on a determination that a central processing unit (CPU) of cell site 102*a* is idle and predicted to continue to be idle for a particular time period. The resource scheduler 106 may then cause the cell site 102*a* to use such available resources to facilitate meeting the demand for additional resources based on the determination. For example, this may be performed via time slice assignment by an operating system task scheduler of the resource controller 216 to tasks originating from remote devices to execute program code associated with those tasks and/or store data.

When the CPU time is again needed to perform primary telecommunication tasks of the cell site 102*a*, the resource scheduler may then automatically send a command to the resource controller 216 to switch to using the CPU of cell site 102*a* for performing the primary telecommunication tasks of the cell site 102*a*. For example, this may be performed via time slice assignment by an operating system task scheduler of the resource controller 216. In some embodiments, some or all of the functionality of resource scheduler 106 may be performed by the resource controller 216 or other component of the cell site 102*a*.

The available processing resources 214 and/or memory resources 212 of the cell site 102*a* may be used for many different types of tasks of remote devices including, but not limited to those regarding: video encoding, video decoding, audio encoding, audio decoding, graphics processing, graphics rendering, video analytics, computer vision, object recognition, location services, data caching, augmented reality computing, virtual reality computing, distributed computing tasks, video or audio storage, data storage, signal processing, system modeling, simulations, machine learning, software application tasks, computing tasks that are not mission-critical, computing tasks that do not have real-time requirements, and computing tasks that are lower priority than the primary tasks of the one or more geographically separated computing nodes.

In some embodiments, the resource scheduler 106 will select a particular computing node, such as cell site 102a, to perform computing and/or provide storage to particular remote devices based on the geographic proximity of the cell site 102a to the particular remote device requesting the resources. For example, the resource scheduler 106 may select cell site 102a to provide computing and/or storage resources to the particular remote requesting such resources because cell site 102a is the closest computing node geographically to the remote device that also has resource available to allocate. This improves latency and reduces network congestion by avoiding adding network traffic over longer and more complex routes.

In various embodiments, the resource scheduler 106 may cause the selected cell site 102a to perform the computing based on one or more of: geographic location of a computing device from which the demand for resources originated; urgency of the demand for resources; priority of the demand for resources; time of day of the demand for resources; maximum latency requirements associated with the demand for resources; a level of the determined availability of the respective computing resource at the cell site 102a; an account associated with a device from which the demand for resources originated; type of data associated with the demand for resources; and predicted availability of the selected cell site.

Such usage data, usage statistics and other metadata associated with the usage (e.g., time of day, day of week, time of month, month of year, time of year, and geographic location of the cell site) may also be communicated as training data to an artificial intelligence or machine learning system of the resource scheduler 106. The resource scheduler 106 may predict availability for allocation of resources of the cell site using an artificial intelligence system that learns to predict the availability based on the usage history to facilitate meeting demand of the remote devices. The resource scheduler may then cause the cell site 102a to automatically use resources of the cell site 102a to facilitate meeting demand of the remote device based on the prediction. For example, the resource scheduler 106 may learn that the cell site 102a is largely idle during certain times of day and schedule processing resources 214 of cell site 102a for use by other remote devices during those times of day.

In some embodiments, the resource scheduler 106 may determine a respective computing resource at cell site 102a is no longer currently available to perform computing in addition to that which is used by the respective computing resource at cell site 102a to provide a particular level of cellular telecommunications service by the cell site 102a. For example, the resource controller 216 or resource scheduler 106 may determine that a current level of telecommunication service demand is not able to be met if the respective computing resource at cell site 102a continues to perform computing in addition to that which is used by the respective computing resource at cell site 102a to provide the level of cellular telecommunications service by the cell site 102a. In response to or otherwise based on this determination, the resource scheduler 106 may select an additional cell site which has been determined to have available resources to perform the computing in addition to that which is used by the respective computing resource at cell site 102a that is no longer currently available. The resource scheduler 106 may then send a resource allocation command to the additional cell site causing the additional cell site to perform the computing and/or storage service. For example, this may be performed via time slice assignment by an operating system task scheduler of the resource controller 216. In some embodiments, the resource scheduler 106 may immediately transition such use of available resources over to the additional cell site to reduce or eliminate the perceived interruption in service to the device requesting such service.

The resource scheduler 106 may include and maintain a database of computing nodes, including cell site 102a and the associated current and predicted availability of individual resources at each computing node for allocation to remote devices. In some embodiments, the resource scheduler 106 may be a server that responds to requests from clients for processing and/or storage resources built around the on-demand software-as-a-service (SaaS), platform-as-a-service (PaaS) and infrastructure-as-a-service (IaaS) delivery models, as well as to requests from clients for resources that are not on-demand, such as large computing tasks that do not have real-time or mission critical requirements. The resource scheduler 106 responds to such requests by selecting available computing nodes and associates resources based on the database of computing nodes and the associated current and predicted availability of individual resources at each computing node for allocation to remote devices. The resource scheduler 106 may also distribute a computing task for a particular remote device and/or data storage across multiple computing nodes, including cell site 102a and/or multiple data centers as processing and/or storage resources become available at particular computing nodes. The resource scheduler 106 may dynamically add more computing nodes to those providing additional processing and/or storage resources as they are needed to meet demand for such resources increases. The resource scheduler 106 may dynamically remove computing nodes from those providing additional processing and/or storage resources as they are no longer needed to meet demand for such resources decreases.

Figure 3:
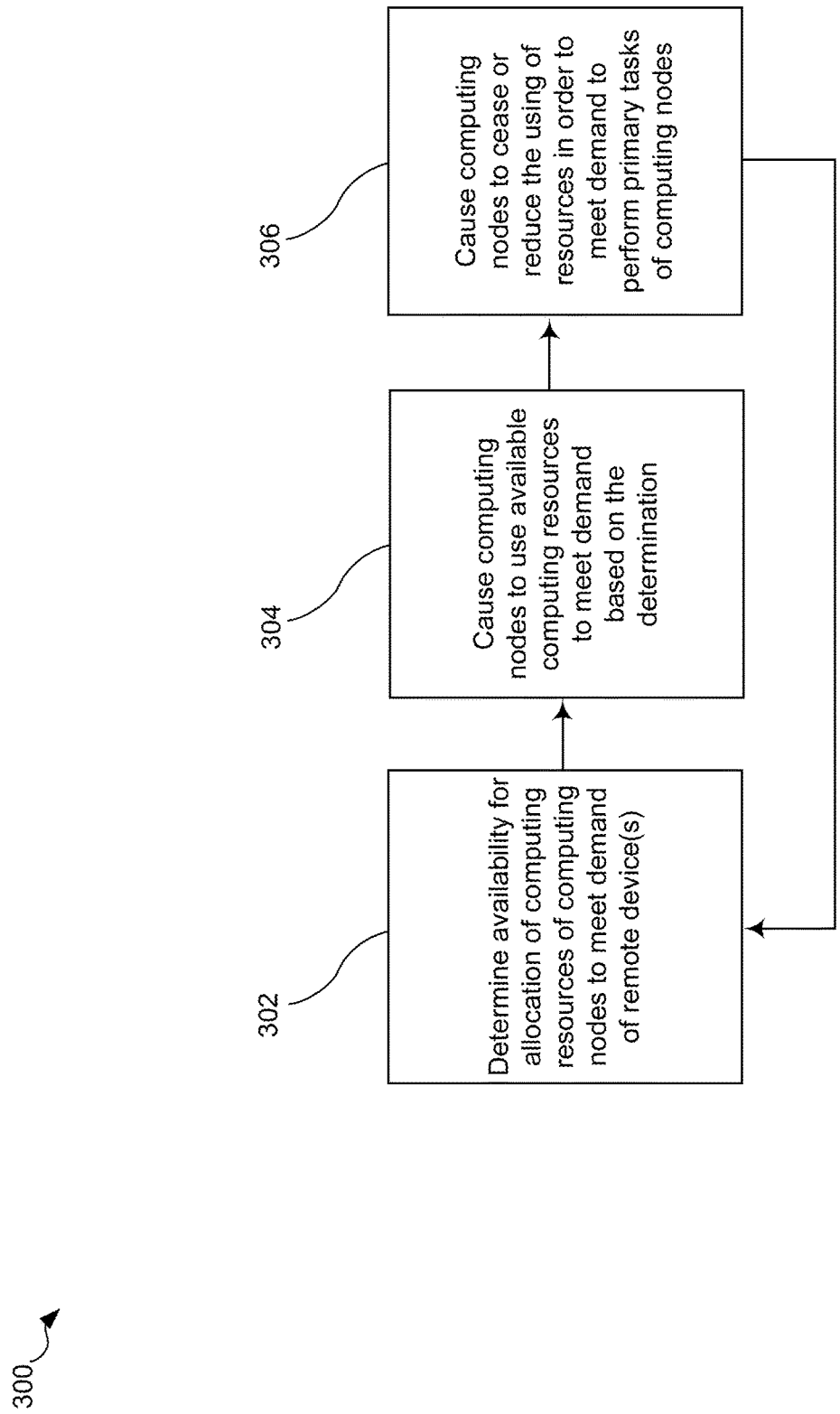
FIG. 3 is a flow diagram of an example process of utilizing distributing computing and storage resources, according to various embodiments of the present disclosure.

FIG. 3 is a flow diagram of an example process 300 of utilizing distributing computing and storage resources, according to various embodiments of the present disclosure.

At 302, the system 100 determines availability for allocation of resources of one or more geographically separated computing nodes to facilitate meeting demand from a remote device for additional resources while also meeting demand to perform primary tasks of the one or more geographically separated computing nodes. For example, the determination of availability for allocation of resources of the one or more geographically separated computing nodes may include determining a processing resource of a computing node is available based on a determination that a CPU of the computing node is idle and predicted to continue to be idle for a particular time period.

At 304, the system 100 causes the one or more geographically separated computing nodes to automatically use available resources of the one or more geographically separated computing nodes to facilitate meeting the demand for additional resources based on the determination.

At 306, the system 100 causes the one or more geographically separated computing nodes to cease or reduce use of resources currently being used for meeting the demand for additional resources in order to meet the demand to perform the primary tasks of the one or more geographically separated computing nodes.

In one embodiment, the resources of the one or more geographically separated computing nodes used to facilitate meeting the demand for additional resources includes processing unit time. Also, the resources of the one or more geographically separated computing nodes used to facilitate meeting the demand for additional resources may include data storage.

Figure 4:
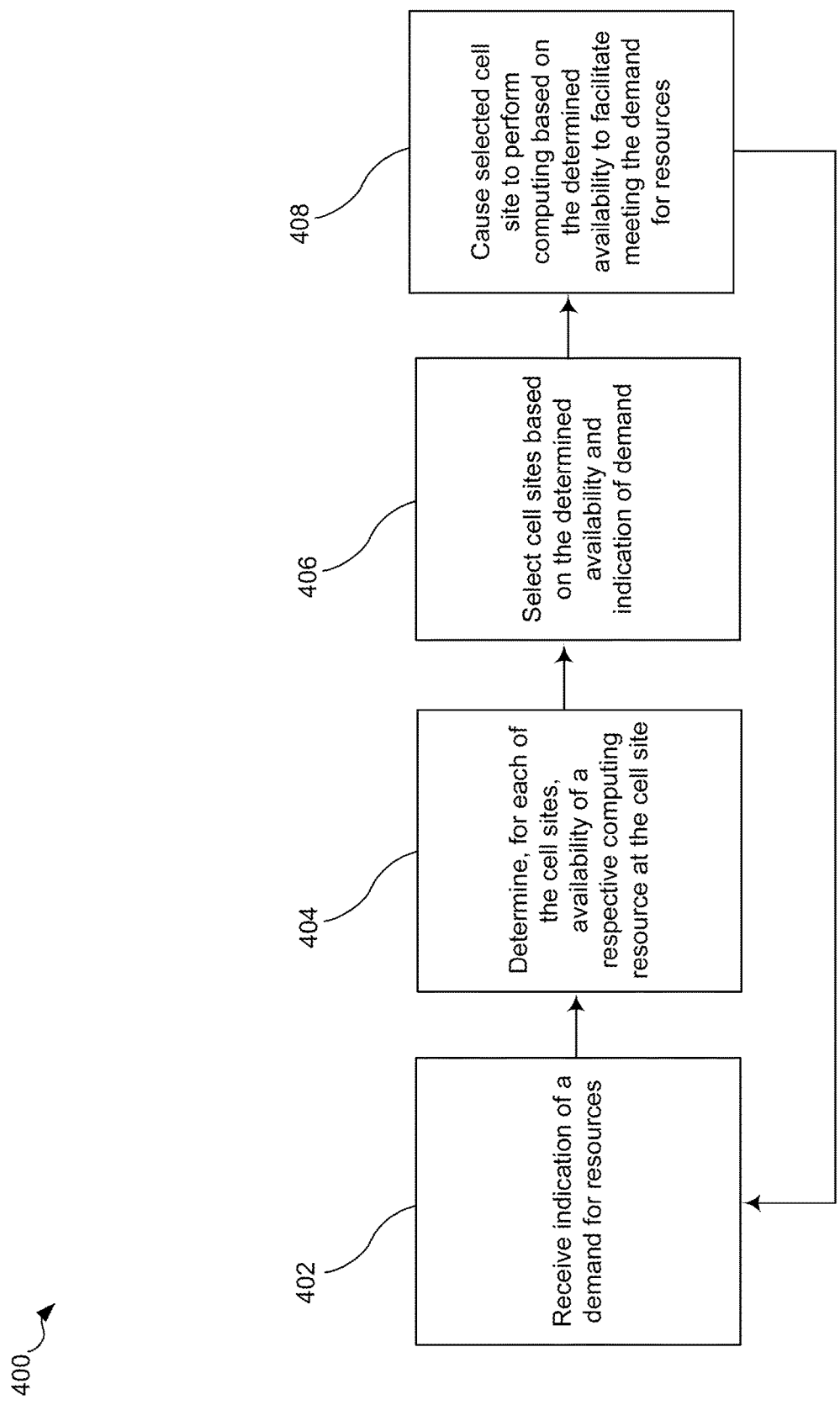
FIG. 4 is a flow diagram of an example process of selecting and using cell sites in utilizing distributing computing and storage resources, according to various embodiments of the present disclosure.

FIG. 4 is a flow diagram of an example process 400 of selecting and using cell sites in utilizing distributing computing and storage resources, according to various embodiments of the present disclosure.

At 402, the system 100 receives an indication of a demand for resources. For example, the resource scheduler 106, cell site 102a, data center 108 and/or other computing node receives a demand for processing and/or storage resources from one or more computing devices 110.

At 404, the system 100 determines, for each of a plurality of cellular (cell) sites, availability of a respective computing resource at the cell site to perform computing in addition to that which is used by the respective computing resource at the cell site to provide a level of cellular telecommunications service by the cell site.

At 406, the system 100 selects one or more cell sites of the plurality of cell sites based on the determined availability and the indication of the demand for resources.

At 408 the system 100 causes, for each selected cell site of the selected one or more cell sites, the selected cell site to perform computing by the respective computing resource at the selected cell site, to facilitate meeting the demand for resources based on the determined availability of the respective computing resource at the selected cell site. This computing by the respective computing resource at the selected cell site is in addition to that which is used by the respective computing resource at the selected cell site to provide a level of cellular telecommunications service by the selected cell site.

In various embodiments, the system 100 may cause the selected cell site to perform the computing based on one or more of: geographic location of a computing device from which the demand for resources originated; urgency of the demand for resources; priority of the demand for resources; time of day of the demand for resources; maximum latency requirements associated with the demand for resources; a level of the determined availability of the respective computing resource at the cell site; an account associated with a device from which the demand for resources originated; type of data associated with the demand for resources; and predicted availability of the selected cell site. For example, higher priority may be given to particular computing devices associated with particular requestors based on a number of different criteria, including but not limited to: type of resource requested; type of service requested; type of computing task; geographic location of device requesting resources; proximity of device requesting resources to a particular cell site or other computing node; type of data to be stored; predicated availability of particular computing resources at a selected computing node or cell site; time of hour, day, week, month and/or year of request for resources; frequency of such requests for resources; amount of payment provided for and/or user subscription or paid account status associated with requested resources; deadlines associated with computing tasks and/or resource usage; and whether computing tasks have real-time or mission-critical requirements.

Figure 5:
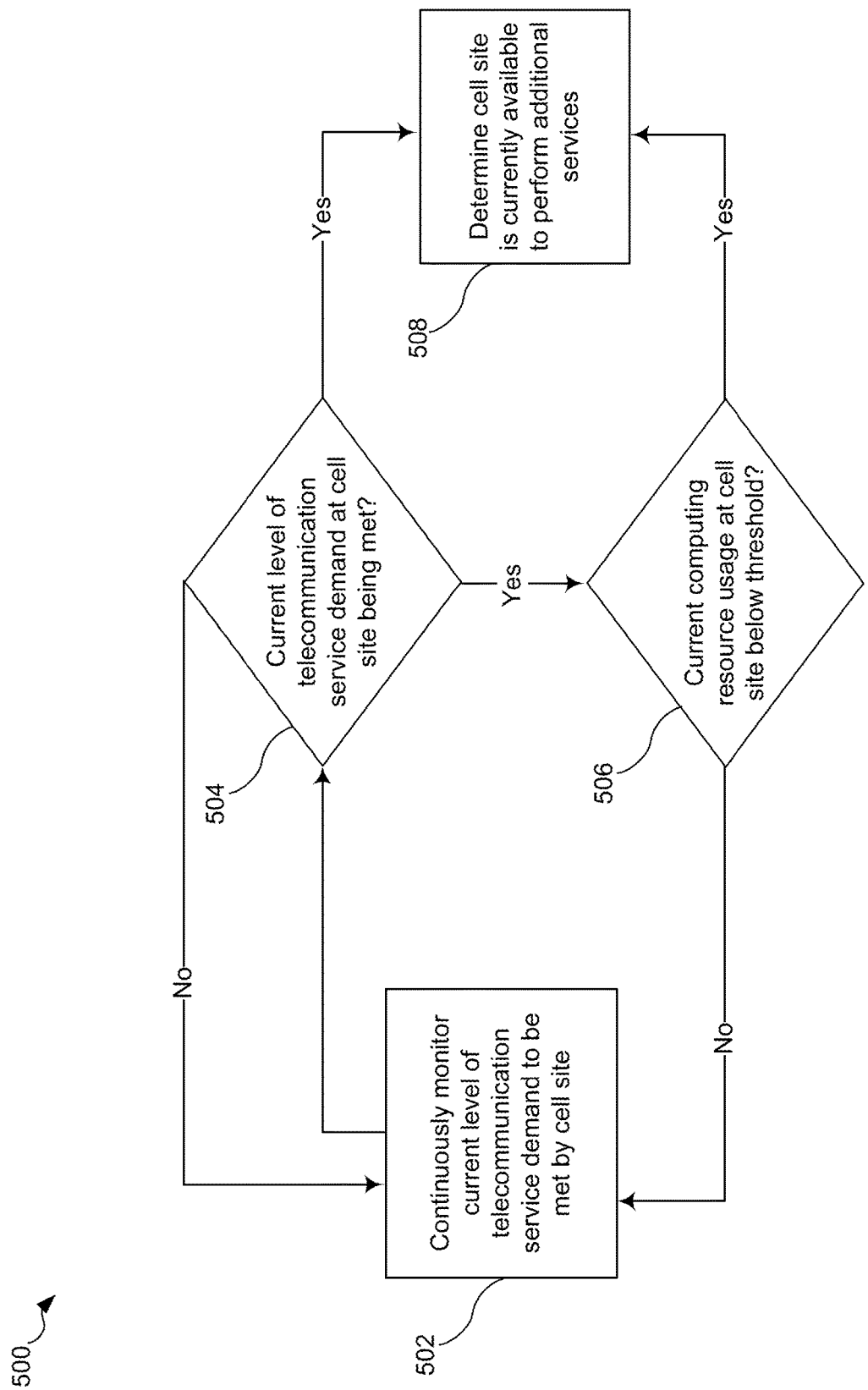
FIG. 5 is a flow diagram of an example process of determining whether cell sites are currently available to perform additional services in utilizing distributing computing and storage resources, according to various embodiments of the present disclosure.

FIG. 5 is a flow diagram of an example process 500 of determining whether cell sites are currently available to perform additional services in utilizing distributing computing and storage resources, according to various embodiments of the present disclosure.

At 502, the system 100 continuously monitors a current level of telecommunication service demand to be met by the selected cell site. In various embodiments, a monitoring check may be based on time slice assignment by an operating system task scheduler of the resource controller 216 of the cell site 102a or operating system of another computing node. The monitoring may occur every processor clock cycle, or occur at some other frequency such as every nanosecond, millisecond, second, minute, number of minutes, hour, etc.

At 504, the system 100 determines whether the current level of telecommunication service demand is being met by the selected cell site. This may occur, for example, in conjunction with and as frequently as the monitoring of the current level of telecommunication service demand to be met by the selected cell site. If it is determined the current level of telecommunication service demand is not being met by the selected cell site, the process proceeds to 502 to continue the monitoring without determining the respective computing resource at the cell site is currently available to perform additional computing. If it is determined the current level of telecommunication service demand is being met by the selected cell site, the process proceeds to 506.

At 506, the system 100 determines whether a current respective computing resource usage at the selected cell site is below a threshold. This may occur, for example, in conjunction with and as frequently as the monitoring of the current level of telecommunication service demand to be met by the selected cell site. If it is determined the current respective computing resource usage at the selected cell site is not below the threshold, then the process proceeds to 502 to continue the monitoring without determining the respective computing resource at the cell site is currently available to perform additional computing for remote devices. The threshold may be selectable and set to a specific level. For example, the threshold may be set such that the respective computing resource at the cell site is only determined to be available to perform additional computing for remote devices when the CPU of the cell site is considered idle, or below a particular selected percentage of usage. If it is determined the current respective computing resource usage at the selected cell site is not below the threshold, then the process proceeds to 508.

At 508, the system determines the respective computing resource at the selected cell site is currently available to perform a service in addition to that which is used by the respective computing resource to provide telecommunication service. For example, this may be based on a determination at 504 that the current level of telecommunication service demand is being met by the selected cell site and a determination at 506 that the respective computing resource at the selected cell site is not at full capacity (or otherwise has usage below a selected threshold).

Figure 6:
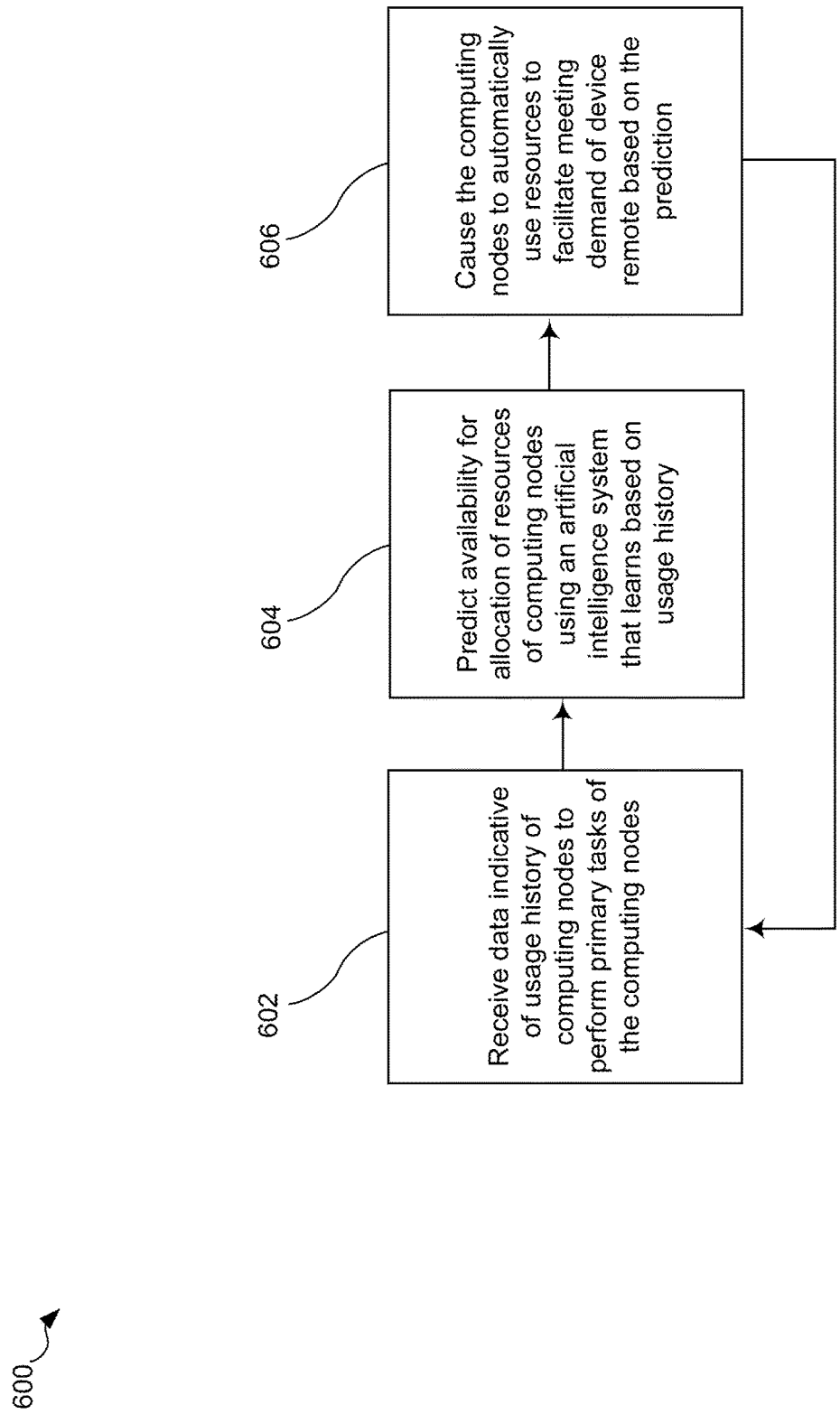
FIG. 6 is a flow diagram of an example process of causing computing nodes to utilize distributing computing and storage resources based on artificial intelligence system prediction, according to various embodiments of the present disclosure.

FIG. 6 is a flow diagram of an example process 600 of causing computing nodes to utilize distributing computing and storage resources based on artificial intelligence system prediction, according to various embodiments of the present disclosure.

At 602, the system 100 receives data indicative of usage history of the one or more geographically separated computing nodes to perform the primary tasks of the one or more geographically separated computing nodes. For example, such primary tasks may be telecommunication operations of cell sites.

At 604, the system 100 predicts availability for allocation of resources of the one or more geographically separated computing nodes using an artificial intelligence system that learns to predict the availability based on the usage history to facilitate meeting demand of the remote device. For example, this may be performed by a machine learning system and/or a neural network having nodes that represent each cell site and/or computing node.

At 606, the system 100 causes the one or more geographically separated computing nodes to automatically use resources of the one or more geographically separated computing nodes to facilitate meeting demand of the remote device based on the prediction using the artificial intelligence system.

Figure 7:
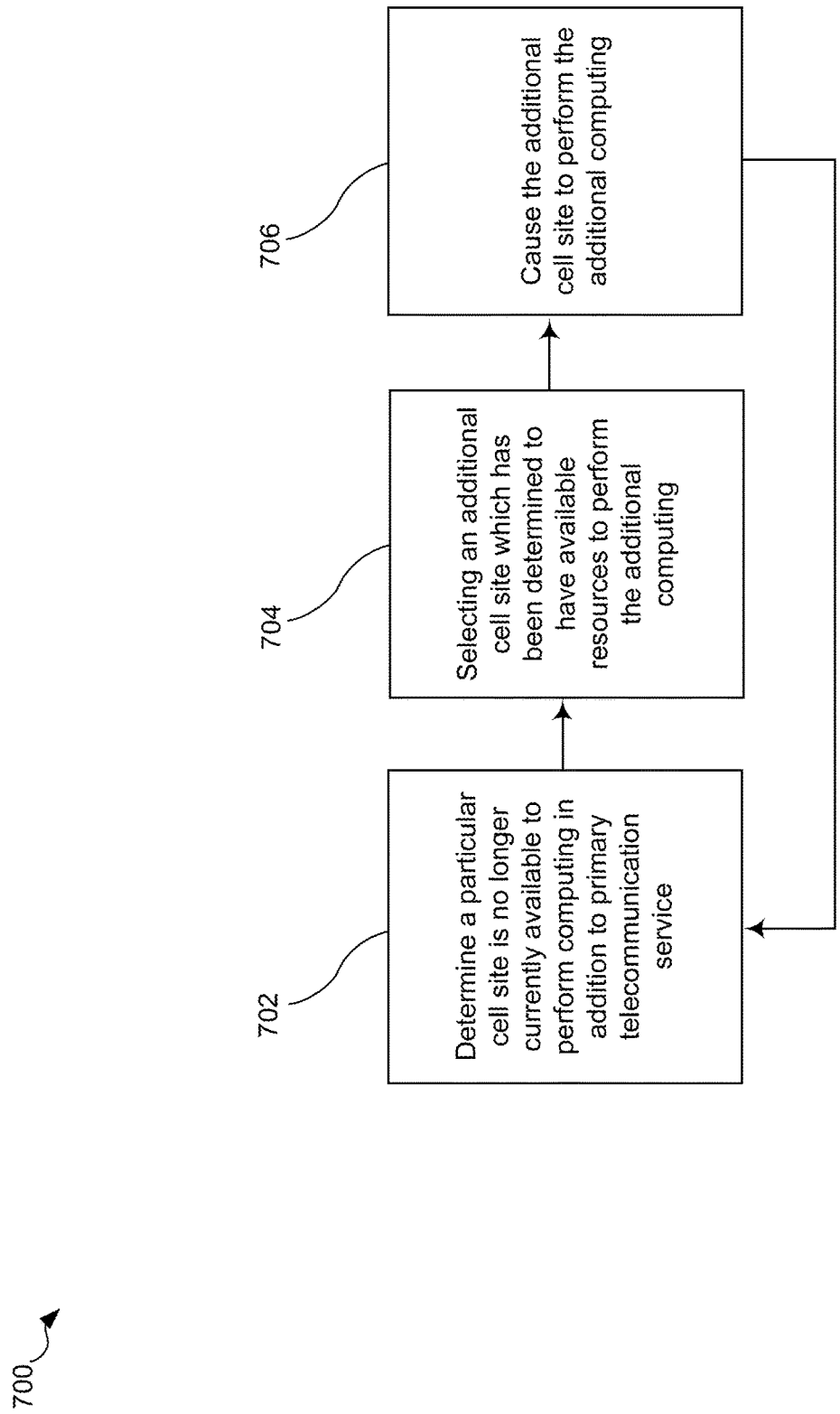
FIG. 7 is a flow diagram of an example process of selecting additional cell sites to perform additional computing in utilizing distributed computing and storage resources, according to various embodiments of the present disclosure.

FIG. 7 is a flow diagram of an example process 700 of selecting additional cell sites to perform additional computing in utilizing distributed computing and storage resources, according to various embodiments of the present disclosure.

At 702, the system 100 determines a respective computing resource at a particular cell site of the plurality of cell sites is no longer currently available to perform computing in addition to that which is used by the respective computing resource at the particular cell site to provide a level of cellular telecommunications service by the particular cell site. This may be based on a determination that a current level of telecommunication service demand is not able to be met if the respective computing resource at the particular cell site continues to perform computing in addition to that which is used by the respective computing resource at the particular cell site to provide the level of cellular telecommunications service by the particular cell site.

At 704, the system 100 selects an additional cell site of the plurality of cell sites which has been determined to have available resources to perform the computing in addition to that which is used by the respective computing resource at the particular cell site that is no longer currently available.

At 706, the system 100 causes the additional cell site of the plurality of cell sites to perform the computing in addition to that which is used by the respective computing resource at the particular cell site that is no longer currently available.

There are various vehicles by which processes and/or systems and/or other technologies described herein can be effected (e.g., hardware, software, and/or firmware), and that the preferred vehicle will vary with the context in which the processes, systems, or other technologies are deployed. For example, if an implementer determines that speed and accuracy are paramount, the implementer may opt for a mainly hardware or firmware vehicle. If flexibility is paramount, the implementer may opt for a mainly software implementation. Yet again, alternatively, the implementer may opt for some combination of hardware, software, with or without firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flash drive, a hard disk drive, an optical disc, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems of mobile wireless communication systems. That is, at least a portion of the devices and/or processes described herein can be integrated into a data processing system of a mobile wireless communication system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops. A data processing system may be implemented utilizing any suitable commercially available components, such as those typically found in data computing/communication and/or network computing/communication systems.

The above description of illustrated embodiments is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary communication service provider systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as flash drives, hard disk drives, optical discs, and computer memory; and other non-transitory computer-readable storage media.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the system 100.

In addition, programming interfaces to the data stored as part of the system 100, can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The system 100 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, remote procedure call (RPC), remote method invocation (RMI), HyperText Transfer Protocol (HTTP), Web Services (Extensible Markup Language-RPC (XML-RPC), Java API for XML-based RPC (JAX-RPC), Simple Object Access Protocol (SOAP), and the like. Other variations are possible. Also, other functionality could be provided by each component/module, or existing functionality could be distributed amongst the components/modules in different ways, yet still achieve the functions of the system 100.

Furthermore, in some embodiments, some or all of the components/portions of the system 100 may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the system 100 present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Unless the context requires otherwise, throughout the specification and which follows, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification, the singular forms "a," "an," and "the" include plural referents unless the content clearly dictates otherwise. It should also be noted that the term "or" is generally employed in its sense including "and/or" unless the content clearly dictates otherwise.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   determining, by at least one computer processor, availability for allocation of resources of a plurality of geographically separated computing nodes to facilitate meeting demand from a remote device for additional resources for tasks that do not have real-time or mission critical requirements while also meeting demand to perform primary tasks that have real-time or mission critical requirements of the plurality of geographically separated computing nodes wherein the plurality of geographically separated computing nodes are cellular (cell) sites, the primary tasks of the plurality of geographically separated computing nodes is telecommunications associated with the cell sites and the additional resources are for computing tasks other than the telecommunications associated with the cell sites and wherein the determining availability for allocation of resources of the plurality of geographically separated computing nodes includes:
      continuously monitoring whether a respective actual current level of telecommunication service demand at each cell site of the cell sites is currently being met by the cell site; and
      determining a processing resource is available on a particular geographically separated computing node of the plurality of geographically separated computing nodes based on a first determination that the respective actual current level of telecommunication service demand at the particular geographically separated computing node is currently being met by the geographically separated computing node;
   based on the continuously monitoring whether a respective actual current level of telecommunication service demand at each cell site of the cell sites is currently being met by the cell site, causing, by the at least one computer processor, the particular geographically separated computing node to automatically use the available processing resource of the particular geographically separated computing node to facilitate meeting the demand from the remote device for additional resources for tasks that do not have real-time or mission critical requirements; and
   causing, by the at least one computer processor, the particular geographically separated computing node to cease or reduce use of the processing resource currently being used for meeting the demand from the remote device for additional resources for tasks that do not have real-time or mission critical requirements in order to meet the demand to perform primary tasks of the particular geographically separated computing node that have real-time or mission critical requirements of the particular geographically separated computing node;
   wherein:
   the first determination that the respective actual current level of telecommunication service demand at the particular geographically separated computing node is currently being met by the geographically separated computing node triggers a second and distinct determination whether a current respective computing resource usage at the particular geographically separated computing node is below a selectable threshold percentage.

2. The method of claim 1 wherein the resources of the plurality of geographically separated computing nodes to facilitate meeting the demand for additional resources include processing unit time.

3. The method of claim 1 wherein the resources of the plurality of geographically separated computing nodes to facilitate meeting the demand for additional resources include data storage.

4. The method of claim 1, further comprising:
   receiving data indicative of usage history of the plurality of geographically separated computing nodes to perform the primary tasks of the plurality of geographically separated computing nodes;
   predicting, by at least one computer processor, the availability for allocation of resources of the plurality of geographically separated computing nodes using an artificial intelligence system that learns to predict the availability based on the usage history to facilitate meeting demand of the remote device; and
   causing the particular geographically separated computing node to automatically use resources of the particular geographically separated computing nodes to facilitate meeting demand of the remote device based on the prediction using the artificial intelligence system.

5. The method of claim 4 wherein the usage history includes usage history of one or more of: one or more processing units of the plurality of geographically separated computing nodes and storage devices of the plurality of geographically separated computing nodes.

6. The method of claim 1 wherein the plurality of geographically separated computing nodes include one or more of: local data centers, regional data centers, national data centers, computing devices and sensors.

7. The method of claim 1 wherein the additional resources are for one or more of: video encoding, video decoding, audio encoding, audio decoding, graphics processing, graphics rendering, video analytics, computer vision, object recognition, location services, data caching, augmented reality computing, virtual reality computing, distributed computing tasks, video or audio storage, data storage, signal processing, system modeling, simulations, machine learning, software application tasks, computing tasks that are not mission-critical, computing tasks that do not have real-time requirements, and computing tasks that are lower priority than the primary tasks of the plurality of geographically separated computing nodes.

8. A non-transitory computer-readable storage medium having computer-executable instructions stored thereon that, when executed by at least one processor, cause the at least one processor to perform:
   determining, by at least one computer processor, availability for allocation of resources of a plurality of geographically separated computing nodes to facilitate meeting demand from a remote device for additional resources for tasks that do not have real-time or mission critical requirements while also meeting demand to perform primary tasks that have real-time or mission critical requirements of the plurality of geographically separated computing nodes wherein the plurality of geographically separated computing nodes are cellular (cell) sites, the primary tasks of the plurality of geographically separated computing nodes is telecommunications associated with the cell sites and the additional resources are for computing tasks other than the telecommunications associated with the cell sites and wherein the determining availability for allocation of resources of the plurality of geographically separated computing nodes includes:
  continuously monitoring whether a respective actual current level of telecommunication service demand at each cell site of the cell sites is currently being met by the cell site; and
  determining a processing resource is available on a particular geographically separated computing node of the plurality of geographically separated computing nodes based on a first determination that the respective actual current level of telecommunication service demand at the particular geographically separated computing node is currently being met by the geographically separated computing node;
  based on the continuously monitoring whether a respective actual current level of telecommunication service demand at each cell site of the cell sites is currently being met by the cell site, causing, by the at least one computer processor, the particular geographically separated computing node to automatically use the available processing resource of the particular geographically separated computing node to facilitate meeting the demand from the remote device for additional resources for tasks that do not have real-time or mission critical requirements; and
  causing, by the at least one computer processor, the particular geographically separated computing node to cease or reduce use of the processing resource currently being used for meeting the demand from the remote device for additional resources for tasks that do not have real-time or mission critical requirements in order to meet the demand to perform primary tasks of the particular geographically separated computing node that have real-time or mission critical requirements of the particular geographically separated computing node;
  wherein:
  the first determination that the respective actual current level of telecommunication service demand at the particular geographically separated computing node is currently being met by the geographically separated computing node triggers a second and distinct determination whether a current respective computing resource usage at the particular geographically separated computing node is below a selectable threshold percentage.

9. The non-transitory computer-readable storage medium of claim 8 wherein causing the selected cell site to perform computing by the computing resource at the selected cell site in addition to that which is used by the computing resource at the selected cell site to provide a level of cellular telecommunications service includes:
  causing the selected cell site to perform the computing based on one or more of:
geographic location of a computing device from which the demand for resources originated; urgency of the demand for resources; priority of the demand for resources; time of day of the demand for resources; maximum latency requirements associated with the demand for resources; a level of the determined availability of the computing resource at the selected cell site; an account associated with a device from which the demand for resources originated; type of data associated with the demand for resources; and predicted availability of the selected cell site.

10. The non-transitory computer-readable storage medium of claim 9 wherein the demand for resources includes a demand for one or more of: video encoding, video decoding, audio encoding, audio decoding, graphics processing, graphics rendering, distributed computing tasks, video or audio storage, data storage, signal processing, system modeling, simulations, machine learning, software application tasks, computing tasks that are not mission-critical, computing tasks that do not have real-time requirements, and computing tasks that are lower priority than the cellular telecommunications service by the cell site.

11. The non-transitory computer-readable storage medium of claim 8 wherein the determining availability includes predicting availability of the respective computing resource at the cell site using an artificial intelligence system that learns to predict the availability of the respective computing resource at the cell site based on usage history of the cell site to provide the cellular telecommunications service.

12. The non-transitory computer-readable storage medium of claim 11 wherein the predicting availability of the respective computing resource at the cell site using an artificial intelligence system results in predicting different availability of the respective computing resource at the cell site based on one or more of: time of day, day of week, time of month, month of year, time of year, and geographic location of the cell site.

13. The non-transitory computer-readable storage medium of claim 8 wherein the determining availability further includes:
  after determining the respective computing resource at the cell site is currently available to perform computing in addition to that which is used by the respective computing resource, determining the respective computing resource at the cell site is no longer currently available to perform computing in addition to that which is used by the respective computing resource based on a determination that the current level of telecommunication service demand is not able to be met if the respective computing resource continues to perform computing in addition to that which is used by the respective computing resource at the cell site to provide the level of cellular telecommunications service by the cell site.

14. The non-transitory computer-readable storage medium of claim 8 wherein the computing resource at the cell site is processing unit time and the determining availability includes determining activity level of one or more processing units at the cell site.

15. The non-transitory computer-readable storage medium of claim 8 wherein the computing resource is data storage and the determining availability includes determining available additional storage capacity at the cell site.

16. The non-transitory computer-readable storage medium of claim 8 wherein the computer-executable instructions, when executed by at least one processor, further cause the at least one processor to perform:
  determining, for each of a plurality of data centers, availability of a respective computing resource at the data center to perform computing in addition to that which is used by the respective computing resource at the data center to provide a level of data service by the data center;
  selecting one or more data centers of the plurality of data centers based on the determined availability and a corresponding indication of a demand for resources; and
  causing, for each selected data center of the selected one or more data centers, the selected data center to perform computing by the respective computing resource at the selected data center in addition to that which is used by the respective computing resource at the selected data center to provide a level of data service by the selected data center based on the determined availability of the respective computing resource at the selected data center.

17. The non-transitory computer-readable storage medium of claim 16 wherein the computer-executable instructions, when executed by at least one processor, further cause the at least one processor to perform:
determining a respective computing resource at a particular cell site of the plurality of cell sites is no longer currently available to perform computing in addition to that which is used by the respective computing resource at the particular cell site to provide a level of cellular telecommunications service by the particular cell site based on a determination that a current level of telecommunication service demand is not able to be met if the respective computing resource at the particular cell site continues to perform computing in addition to that which is used by the respective computing resource at the particular cell site to provide the level of cellular telecommunications service by the particular cell site;
selecting an additional cell site of the plurality of cell sites which has been determined to have available resources to perform the computing in addition to that which is used by the respective computing resource at the particular cell site that is no longer currently available; and
causing the additional cell site of the plurality of cell sites to perform the computing in addition to that which is used by the respective computing resource at the particular cell site that is no longer currently available.

18. A system, comprising:
at least one computer processor; and
at least one memory coupled to the at least one computer processor, the at least one memory having computer-executable instructions stored thereon that, when executed by the at least one computer processor, cause the at least one computer processor to perform:
determining, by at least one computer processor, availability for allocation of resources of a plurality of geographically separated computing nodes to facilitate meeting demand from a remote device for additional resources for tasks that do not have real-time or mission critical requirements while also meeting demand to perform primary tasks that have real-time or mission critical requirements of the plurality of geographically separated computing nodes wherein the plurality of geographically separated computing nodes are cellular (cell) sites, the primary tasks of the plurality of geographically separated computing nodes is telecommunications associated with the cell sites and the additional resources are for computing tasks other than the telecommunications associated with the cell sites and wherein the determining availability for allocation of resources of the plurality of geographically separated computing nodes includes:
continuously monitoring whether a respective actual current level of telecommunication service demand at each cell site of the cell sites is currently being met by the cell site; and
determining a processing resource is available on a particular geographically separated computing node of the plurality of geographically separated computing nodes based on a first determination that the respective actual current level of telecommunication service demand at the particular geographically separated computing node is currently being met by the geographically separated computing node;
based on the continuously monitoring whether a respective actual current level of telecommunication service demand at each cell site of the cell sites is currently being met by the cell site, causing, by the at least one computer processor, the particular geographically separated computing node to automatically use the available processing resource of the particular geographically separated computing node to facilitate meeting the demand from the remote device for additional resources for tasks that do not have real-time or mission critical requirements; and
causing, by the at least one computer processor, the particular geographically separated computing node to cease or reduce use of the processing resource currently being used for meeting the demand from the remote device for additional resources for tasks that do not have real-time or mission critical requirements in order to meet the demand to perform primary tasks of the particular geographically separated computing node that have real-time or mission critical requirements of the particular geographically separated computing node;
wherein:
the first determination that the respective actual current level of telecommunication service demand at the particular geographically separated computing node is currently being met by the geographically separated computing node triggers a second and distinct determination whether a current respective computing resource usage at the particular geographically separated computing node is below a selectable threshold percentage.

19. The system of claim 18 wherein the service in addition to that which is used by the respective computing resource at the determined cell site is processor unit time for a computing task distributed among the plurality of cell sites.

20. The system of claim 18 wherein the service in addition to that which is used by the respective computing resource at the determined cell site is data storage distributed among the plurality of cell sites.

* * * * *